United States Patent
Szydlo et al.

(10) Patent No.: US 9,860,122 B2
(45) Date of Patent: Jan. 2, 2018

(54) SYSTEMS AND METHODS FOR DYNAMIC ADAPTIVE MACHINE

(71) Applicant: Corero Networks Security, Inc., Hudson, MA (US)

(72) Inventors: Marcos Szydlo, Acton, MA (US); Thomas J. Teixeira, Harvard, MA (US)

(73) Assignee: Corero Networks Security, Inc., Hudson, MA (US)

( * ) Notice: Subject to any disclaimer, the term of this patent is extended or adjusted under 35 U.S.C. 154(b) by 143 days.

(21) Appl. No.: 14/610,658

(22) Filed: Jan. 30, 2015

(65) Prior Publication Data

US 2015/0222644 A1    Aug. 6, 2015

Related U.S. Application Data

(60) Provisional application No. 61/934,461, filed on Jan. 31, 2014.

(51) Int. Cl.
*H04L 29/06* (2006.01)
*H04L 12/24* (2006.01)

(52) U.S. Cl.
CPC ...... *H04L 41/0813* (2013.01); *H04L 63/0227* (2013.01); *H04L 63/1408* (2013.01)

(58) Field of Classification Search
CPC ............. H04L 63/1408; H04L 63/0227; H04L 41/0813; H04L 47/125; H04L 49/55; H04L 49/555
See application file for complete search history.

(56) References Cited

U.S. PATENT DOCUMENTS

| | | | |
|---|---|---|---|
| 8,014,278 B1 * | 9/2011 | Subramanian ...... | H04L 12/2867 370/229 |
| 2009/0328219 A1 * | 12/2009 | Narayanaswamy | H04L 63/1425 726/23 |
| 2013/0152196 A1 * | 6/2013 | Garg .................. | H04L 63/1441 726/22 |

* cited by examiner

*Primary Examiner* — Edward Zee
*Assistant Examiner* — Chi Nguy
(74) *Attorney, Agent, or Firm* — Goodwin Procter LLP (57) ABSTRACT

A Dynamic Adaptive Machine (DAM) classifies a received packet into a packet group and selects an initial level of processing for that group based on, at least in part, a measure of load of the system for processing the packet. The DAM continues to monitor the system load and re-computes the load measure, and increases or decreases the processing level according to the load measure. The DAM considers one or more processing states and, after an increase in the processing level, ignores for a certain grace period any errors generated at the higher level of processing, to minimize false positive errors.

18 Claims, 2 Drawing Sheets

FIG. 1

| Time | Group g1 Level Index | Processing Engines | Filters Turned OFF | Group G2 Level Index |
|---|---|---|---|---|
| t0 | L3* | P3 | | |
| t1 | L2 | P3, P2 | F3 | |
| t2 | L1 | P3, P2, P1 | F3 | L1* |
| t3 | L1 | P3, P2, P1 | F3, F2 | L1 |
| t4 | L2 | P3, P2 | F3, F2, F1 | L1 |
| t5 | L1* | P3, P2, P1 | F3, F2 | L2* |
| | | | F3, F2 | L2 |

FIG. 2

SYSTEMS AND METHODS FOR DYNAMIC ADAPTIVE MACHINE

CROSS-REFERENCE TO RELATED APPLICATIONS

This application claims priority to and the benefit of, and incorporates herein by reference in its entirety, U.S. Provisional Patent Application No. 61/934,461, entitled "System and Method for Dynamic Adaptive Machine," which was filed on Jan. 31, 2014.

FIELD OF THE INVENTION

This disclosure generally relates to processing of data packets and, more particularly to techniques for optimizing the processing.

BACKGROUND

In digital communications networks, packet processing generally includes various algorithms that are applied to a packet of data or information. A packet typically includes a header, which typically specifies the packet's origin, destination, and length, and a payload that includes data and/or control information to be communicated using the packet. Error detection and correction information may be included in the trailer of a packet. The various packet processing algorithms generally analyze one or more components of a packet, i.e., the packet's header, payload, and trailer. Applications based on packet payload, often called data applications, include transcoding, voice recognition, security breach analysis, targeted advertising, copyright enforcement, etc. Some data applications may employ deep packet inspection. In intrusion detection, a statistical analysis may be performed on a stream of packets. Alternatively, or in addition, signature-based inspection of the packets may also be performed.

In general, one or more types of processing may be applied using one or more processing engines to the packets flowing through a network. The processing engines may be configured to process the packets sequentially, in parallel, or partially in parallel. Generally, the processing engines are logical entities that are implemented using one or more software components executing on one or more processors. For example, a single processor may implement all processing engines, each processing engine may be implemented using a processor dedicated thereto, or the various processing engines may be implemented by several processors, where the number of processors is less than the number of processing engines.

Once a certain set of processing engines is selected for processing the packets of a packet stream, the load of the one or more processors implementing those processing engines can vary from time to time in an unpredictable manner. The reasons for such load variation include a change in the number of packets and/or packet streams received, variations in the nature and/or size of the packets, a change in the availability of the processors, variations in individual processor loads, if those processors are configured to perform additional tasks. An increase in the overall load typically results in slowing down the processing of the packets. This can result in excessive communication delays. If the load of any of the processors becomes excessive, packets may be dropped and communication links can break down.

SUMMARY

Various embodiments of systems and methods described herein allow for efficient and effective processing of packets, as the load of the processors and/or other parameters change, while minimizing the situations in which excessive communication delays and/or dropped packets and broken communication links occur. This is achieved, in part, by dynamically and adaptively selecting the processing to be performed for the packets flowing through a network. To this end, a processing level is initially designated to a group of packets and the packets belonging to that group are processed according to the designated level. If a high processing level (often indicated by a low index number) is designated to a group, many or all processing engines are applied to the packets of that group. If a low processing level (often indicated by a high index number) is designated to a group, only some or only a single processing engine is applied to the packets of that group. The initial designation of the processing level can be random or adaptive, i.e., it may be based on the effects of past processing of the packets of the group.

The designation can also be dynamic, i.e., if the load of one or more processors changes and/or any other observed parameters change, the processing level can be adjusted to apply more or less processing. In many packet processing systems, the different processing engines produce signals indicating a particular characteristic of the inspected packet. These signals can be aggregated by an analyzer to draw inferences and to take actions based thereon. For example, a packet may be determined to be harmful, malicious, and may be dropped, or the packet may be determined to be authentic and high priority, and may be forwarded to the destination thereof. In dynamically applying processing engines, the signals generated by a particular processing engine are filtered based on the context in which that particular processing engine is applied. This can minimize generation and processing spurious, erroneous signals by the processing engines.

Accordingly, in one aspect, a dynamically configurable module includes a controller (e.g., a processor programmed as a controller, a software module that can program a processor to function as a controller, a mixed hardware-software module, etc.), to designate a first operational level to a packet group. The designation is based on a first measure of a load, and the first operational level is selected from a number of operational levels. One of the several operational levels is a full operational level and the operational levels include a set of distinct partial operational levels, i.e., at least one other partial operational level. The controller configures a processing engine to process the packet group according to the first operational level. If the first operational level is not the full operational level and if a second measure of the load represents less load than the first measure, the controller designates a second operational level to the packet group, based on the second measure of the load. The second operational level is also selected from the several operational levels. At least partial processing is performed at the second operational level, and the processing corresponding to the second operational level is greater than the partial processing corresponding to the first operational level. The controller reconfigures the processing engine according to the second operational level, and determines a state of the processing engine based on the first and second operational levels.

The load may include one or both of a processor load and a packet queue size. The controller may be configured to determine a token of time based on at least in part, at least one of: a randomized function, a characteristic of the group, the first operational level, and the load. The controller may associate the token of time with the designation of the first operational level to the packet group.

In some embodiments, if a third measure of the load represents more load than the second measure, the controller is configured to designate a third operational level to the packet group, based on the third measure of the load. The third operational level is also selected from the several operational levels. Partial processing corresponding to the third operational level is no less than the partial processing corresponding to the first operational level and is less than the partial or full processing corresponding to the second operational level.

In some embodiments, the dynamically configurable module further includes a reconfigurable processing engine configured to perform one or more operations on a packet in the group. Reconfiguration of the processing engine may include selecting a set of operations to be performed based on, at least in part, an operational level designated to the group. The reconfigurable processing engine may include a first processing unit that is associated with a high operational level in the set of distinct partial operational levels, and that is not associated with a different, low operational level in the set; and a second processing unit that is associated with both the high level and the low level. The operational level may thus be an index, i.e., a high operational level may correspond to a lower level of processing than the level of processing associated with a low operational level. The reconfigurable processing engine may be programmed to provide network security, e.g., intrusion detection.

In some embodiments, the controller is further configured to update the state of the processing engine based on a duration of processing. The dynamically configurable module may further include an error filter to filter out an error signal received from the processing engine based on the state of the processing engine determined by the controller, thereby minimizing a false-positive error rate. In some embodiments, the controller may monitor a token of time associated with the group. Upon expiration of the token of time, the controller may designate a fourth operational level to the packet group, based on a fourth measure of the load, the fourth operational level may be selected from the several operational levels, and may reconfigure a processing engine to process the packet group according to the fourth operational level.

In another aspect, a method is provided for dynamically and/or adaptively configuring the processing of packets. The method includes designating a first operational level to a packet group based on a first measure of a load. The first operational level is selected from a number of operational levels. The several operational levels include a full operational level and a set of distinct partial operational levels. The method further includes configuring a processing engine to process the packet group according to the first operational level, and obtaining a second measure of the load. The method also includes determining, if the first operational level is not the full operational level, if the second measure of the load represents less load than the first load measure. In addition, the method includes designating a second operational level to the packet group based on the second measure of the load. The second operational level is also selected from the several operational levels. The second operational level may correspond to full processing or to partial processing. If only partial processing corresponds to the second operational level, that partial processing is greater than a partial processing corresponding to the first operational level. If the second operational level is designated to the packet group, the method includes reconfiguring the processing engine according to the second operational level, and determining a state of the processing engine based on the first and second operational levels.

The load may include one or both of a processor load and a packet queue size. In some embodiments, the method includes determining a token of time based on, at least in part, one or more of: a randomized function, a characteristic of the group, the first operational level, and the load. The method may further include associating the token of time with the designation of the first operational level to the packet group. The state of the processing engine may be updated based on, at least in part, a duration of processing.

In some embodiments, the method includes obtaining a third measure of the load. If the third measure of the load represents more load than the second measure, the method includes designating a third operational level to the packet group, based on the third measure of the load. The third operational level is also selected from the several operational levels, where partial processing corresponding to the third operational level is no less than the partial processing corresponding to the first operational level and is less than the full or partial processing corresponding to the second operational level.

In some embodiments, the method includes filtering out an error signal received from the processing engine based on the state of the processing engine, thereby minimizing a false-positive error rate. The method may also include selecting a grace period, and turning off the filtering after expiration of the grace period. The grace period may be selected using a random function. In some embodiments, the reconfigurable processing engine is programmed to provide network security, e.g., intrusion detection.

These and other objects, along with advantages and features of the embodiments disclosed herein, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

A Dynamic Adaptive Machine (DAM) is a network apparatus designed to manage the resources of a network device, to make sure the resources do not become scarce. To this end, various embodiments of a DAM selectively speed up the processing of some packets, by applying relatively fewer processing engines to those packets. This is done in a way that minimizes the number of undesirable side effects that may occur. In particular, a processing engine can generate outcomes, e.g., error signals, based on the characteristics of a processed packet. These outcomes/signals may be analyzed further to draw inferences and to take actions such as forwarding or dropping packets. Some processing outcomes may depend not only on the processing of an individual packet but also on the state attained by previous packet processing. When a processing engine is newly introduced, the state attained thereby, at least for a certain time immediately after the introduction, can be different than the state that would have been attained had that processing engine been processing previous packets in a stream/group. Therefore, the newly introduced processing engine may generate some erroneous signals. To avoid or minimize further analysis of such signals, the signals generated by a newly introduced processing engine may be filtered out until such time that the processing engine reaches an expected state.

Various embodiments of DAMs described herein are lightweight, i.e., the mechanism that tries to manage resources under scarce conditions does not itself use many of those resources. Various embodiments of DAMs are also minimally intrusive, i.e., the network device tries to process as many packets as possible and, typically, a DAM intervenes only when necessary. A DAM can minimize undesirable side effects by considering a state of the processing of the group to which an individual packet belongs, and not just the results of the processing of a single packet. One or more configuration parameters of various embodiments of a DAM, such as the processing level that is initially designated to a group, a time period for which the initial designation applies, etc., may be randomized. This can minimize the likelihood that a stream of packets can be designed such that some malicious packets would avoid full or a high level of processing and, thus, would not be detected by an intrusion detection system. Various embodiments of a DAM can optimize processing regardless of the protocols used by different packet streams/groups.

In order to adapt dynamically and rapidly to the changing traffic conditions and resource availability, various DAM embodiments monitor one or more system parameters according to a specified configuration. Examples of monitored parameters include processor/CPU utilization; the number of buffers available in a given pool, rate of buffer depletion, or both; the number of entries present in a given queue, rate of queue size change, or both; and the number of empty slots in a given table, rate of slot depletion, or both.

A DAM also includes a list of operational levels. The number and/or types of processing engines applied to the received packet are related to the operational level. As such, specifying an operation level is analogous to specifying the amount and/or type of processing to be applied to the arriving packets. The set of available levels and/or the corresponding processing characteristics, e.g., the number and/or types of processing engines to be applied can be specified by the configuration. In some embodiments, the total number of operational levels (e.g., 2, 4, 5, 10, etc.), and whether the relationship between processing levels and the numbers and/or types of processing engines to be employed for the different levels is linear, exponential, or non-linear but not exponential, e.g., quadratic, may be specified by the configuration. In one embodiment, a level identified by the lowest index (e.g., 0) represents full processing. Increasing levels (e.g., level 1, 4, etc.) represent a lesser degree of processing and, thus, faster packet handling.

In processing a packet using a DAM, the packets may be grouped according to one or more specified criteria. Examples of the criteria used include whether the packets belong to a particular flow, source IP address or address range, destination IP address or address range, whether the packets belong to a particular virtual local area network (VLAN), etc. Various DAM embodiments use information about the availability of resources, e.g., the various monitored system parameters, to calculate the operational level to be initially designated to a packet group for a certain duration, or a new operational level, which can replace the level initially designated to a packet group.

When a packet arrives, the processing it would receive may be based on, at least in part, the operational level that was initially designated to the group to which the packet belongs and/or on the current level of processing applied to the packets of the group. For example, if the grouping is based on flows and the flow to which a received packet belongs is currently being treated according to operational level "2," the new packet may also be processed at the operational level "2." If the received packet belongs to a new flow (a new group, in general), that packet may be processed according to the latest operational level calculated by an embodiment of a DAM. The new operational level may be generated randomly or may be determined based on the current values of one or more monitored system parameters.

The processing level initially designated to a packet group may be in effect for only a certain amount of time (also called a token of time). This token of time may be selected at random. After that token of time expires, the packet group may be assigned a new initial operational level, for another token of time. The two tokens, i.e., time periods, can be the same or they can be different. Similarly, the two processing levels initially designated for two different tokens of time can be the same or different.

Within a particular token of time, if operational level calculation based on one or more monitored parameters indicates that the availability of one or more system resource (e.g., processors, processing engines, buffers, etc.), has increased and/or is likely to increase, the processing level assigned to the packet group may be increased. If, on the other hand, the operation level calculation indicates the availability of one or more resources has decreased and/or is likely to decrease, the processing level assigned to the packet group may be decreased.

In some embodiments, the lowest processing level assigned to a group is the level initially designated to that group. For example, if the available processing levels are indexed from 0 to 5, Level 0 being the highest level and Level 5 being the lowest level of processing, and if a group is initially assigned Level 4 for a token of time, during that token of time the processing level may increase from Level 4 (e.g., Level 2, Level 1, etc.), and may subsequently decrease, (e.g., to Level 3, Level 4, etc.). During that token of time, however, the assigned level would not decrease below the initially designed level (i.e., Level 4), to Level 5. In some embodiments, the lowest assigned level during a token of time can be lower than the initially designated level for that token of time. Thus, in these embodiments, the lowest assigned level can be the lowest available processing level, such as Level 5 in the example above.

In various embodiments, DAMs keep track of the previous state or states of a packet group. If the designation of new level to a packet group leads to a higher level of processing, an embodiment of a DAM may apply a temporary or a permanent grace period with regard to at least some of the results obtained from the increased level of processing, in order to minimize undesirable side effects. In particular, during such grace period, the signals generated by a newly added processing engine may be ignored, and may not be analyzed further. Thus, for a selected operational level, an embodiment of a DAM selects a set of processing engines using which the arriving packets will be processed. If a grace period is in force, an embodiment of a DAM may choose to ignore, during the grace period, the output of some of the selected processing engines. The grace period to be applied when a processing level is increased may depend on the previous state (i.e., the state before increasing the level) of the packet group. In some embodiments, the grace period is randomized.

The overall processing, i.e., classification of an arriving packet into a group, selection of a token of time, designation of the initial processing level for that token of time, adjustments to the processing level during the token of time, selection of a grace period, ignoring/filtering signals generated by one or more processing engines during the grace period, and repeating one or more of these steps after the expiration of the token of time, may continue for the life of a packet group. Various embodiments of a DAM are thus dynamic because the amount and/or type of processing applied to the arriving packets may vary according to the availability of one or more system resources. Various embodiments of a DAM are also adaptive because the initial selection of the processing levels assigned to a particular group and subsequent adjustments to that level may depend on information learned from the behavior and processing history of that packet group. For example, based on the past history, an embodiment of a DAM can strengthen or loosen the processing to be applied to a particular packet group, and may adjust it further, if necessary, according to the resources available for processing. As such, various embodiments of DAMs described herein can avoid or at least minimize excessive processing delays and dropped packets and/or communication links, while maximizing the utilization of available processing resources, thereby maximizing the processing applied to the packets flowing through a network.

Figure 1:
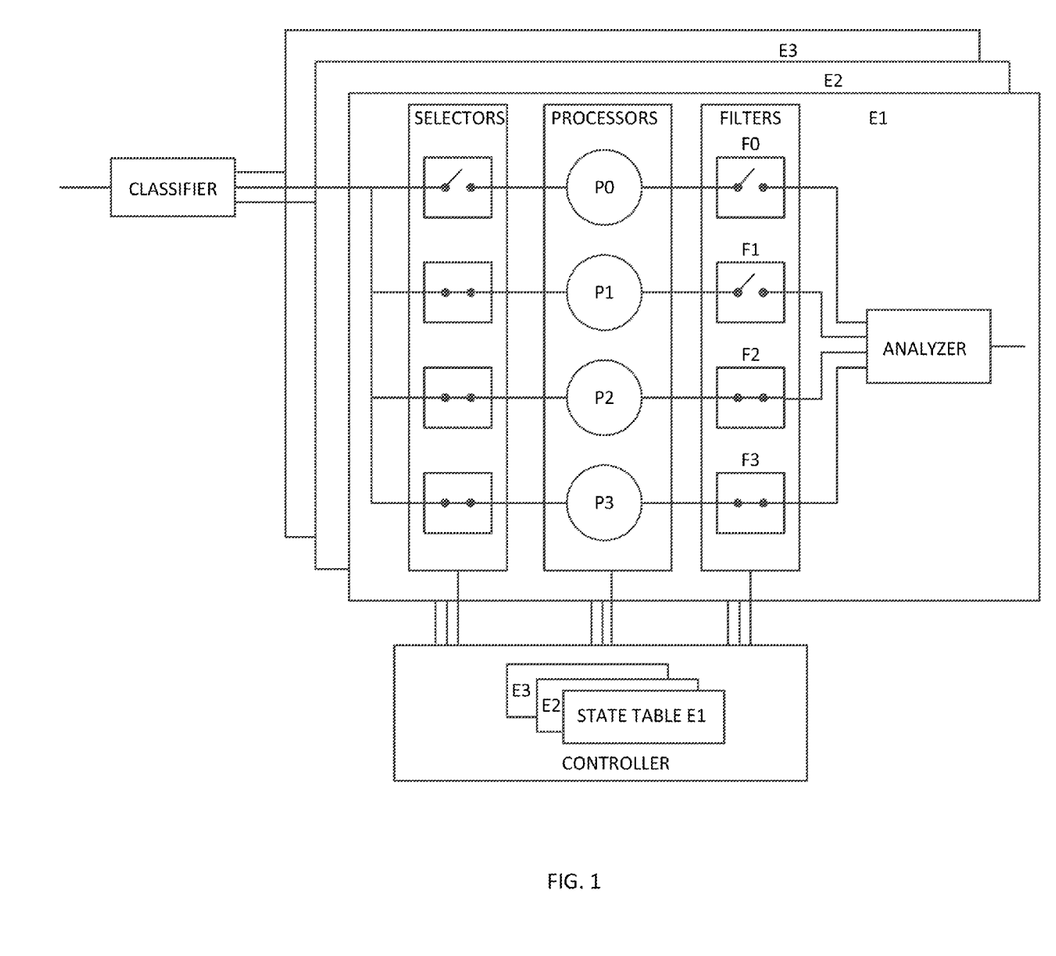
FIG. 1 schematically depicts a packet processing system configured by a controller, according to one embodiment.

With reference to FIG. 1, an exemplary Dynamic Adaptive Machine (DAM) can designate four different operational levels, namely, L0, L1, L2, and L3. Various embodiments may include as few as two and more (e.g., 8, 10, 15) operational levels. A different type or level of processing is performed at each operational level. For example, at level L0 full processing, including processing of all four types P0, P1, P2, and P3 is performed. At level L1, partial processing, i.e., processing of types P1, P2, and P3 is performed. At level L2, processing of types P2 and P3 is performed, and at level L3, only the processing of type P3 is performed. In some embodiments, as an operation level changes, one or more types of processing can be replaced with one or more other types of processing. Though there are four processing types corresponding to four operational levels in this example, the number of types of processing can be different than the number of operational levels, in general. Also, even though FIG. 1 depicts that all four types of processing may be performed in parallel, in some embodiments one or more types of processing may be performed sequentially. The various types of processing may be performed using one or more processors.

The classifier receives a packet and determines whether the packet belongs to an existing group. If not, a new group (e.g., group g1) is created by the classifier. An initial operational/processing level is assigned to the new group by the controller based on, at least in part, a load. An instance of a processing engine is created for the new group, and that instance is configured, e.g., using a selector, according to the designated operational level. For example, if the designated operational level is L2, processing of types P0 and P1 is at least initially not performed for the packets of the new group, and processing of types P2 and P3 is performed at least initially. In some embodiments, the instance of the processing engine includes a controller for that instance, which can maintain a state of that instance in a state table.

In some embodiments, the processing according to the initial designation of the operational level to a group (e.g., processing of types P2 and P3 for the group g1) is never omitted for that new group at least until the initial designation of the operating level for the group (e.g., Level L2 for the group g1) expires. The expiration of the initial designation can be determined according to a token of time allocated by the controller to the group. The token of time period can be a randomly selected time duration, or may be based on one or more system parameters (e.g., a certain number of groups being processed, current processing level of the group, etc.), or combinations thereof.

Any type of processing that is performed on a packet of a group can generate one or more signals, such as, an error signal, depending, e.g., on the structure and/or contents of the packet. Additionally, the generation of the signals may also depend on any processing of that and/or other type(s) of one or more previously received packets of the group.

The controller may continue to monitor the load and, if the load decreases at a later time, may change the operational levels that were originally designated to one or more of the packet groups. In some embodiments, a new operational level corresponds to increased processing and not to less processing than that corresponding to the initial designation. For any group for which the operational level is adjusted, additional and/or different processing may be performed for the later received packets of that group. The additional and/or different processing can be provided, e.g., by engaging one or more additional types of processing, replacing one or more previous types of processing with one or more new types of processing, etc.

Typically, the additional and/or different type of processing has not processed one or more packets of the group that were received before the adjustment of the operational level. As such, the additional and/or different processing may produce some signals, such as error signals, that would not have been produced had such processing been applied to one or more packets of the group received prior to the adjustment of the operational level. Such a signal, therefore, may be a false positive signal.

To minimize and/or eliminate any occurrences of such false positive signals, the controller may maintain a state of the instance of the processing engine corresponding to each group in respective state tables, and filter out one or more signals generated during processing using the state information. For example, if the operational level of a group was changed from L2 to L1, the new processing type P1 may be added, as described above. Until one or more specified conditions occur, any signal generated by processing P1 may be filtered out (e.g., using a filter F1) while the signals generated by the processing types P2 and P3 may be allowed to pass to an analyzer for further processing. The specified conditions may include, e.g., a specified time duration (e.g., a few seconds, minutes, etc.), a number of packets processed after the level adjustment, etc. After the specified condition occurs, the filter F1 may be turned off, so that the analyzer may analyze any signals generated by the processing type P1.

Figure 2:
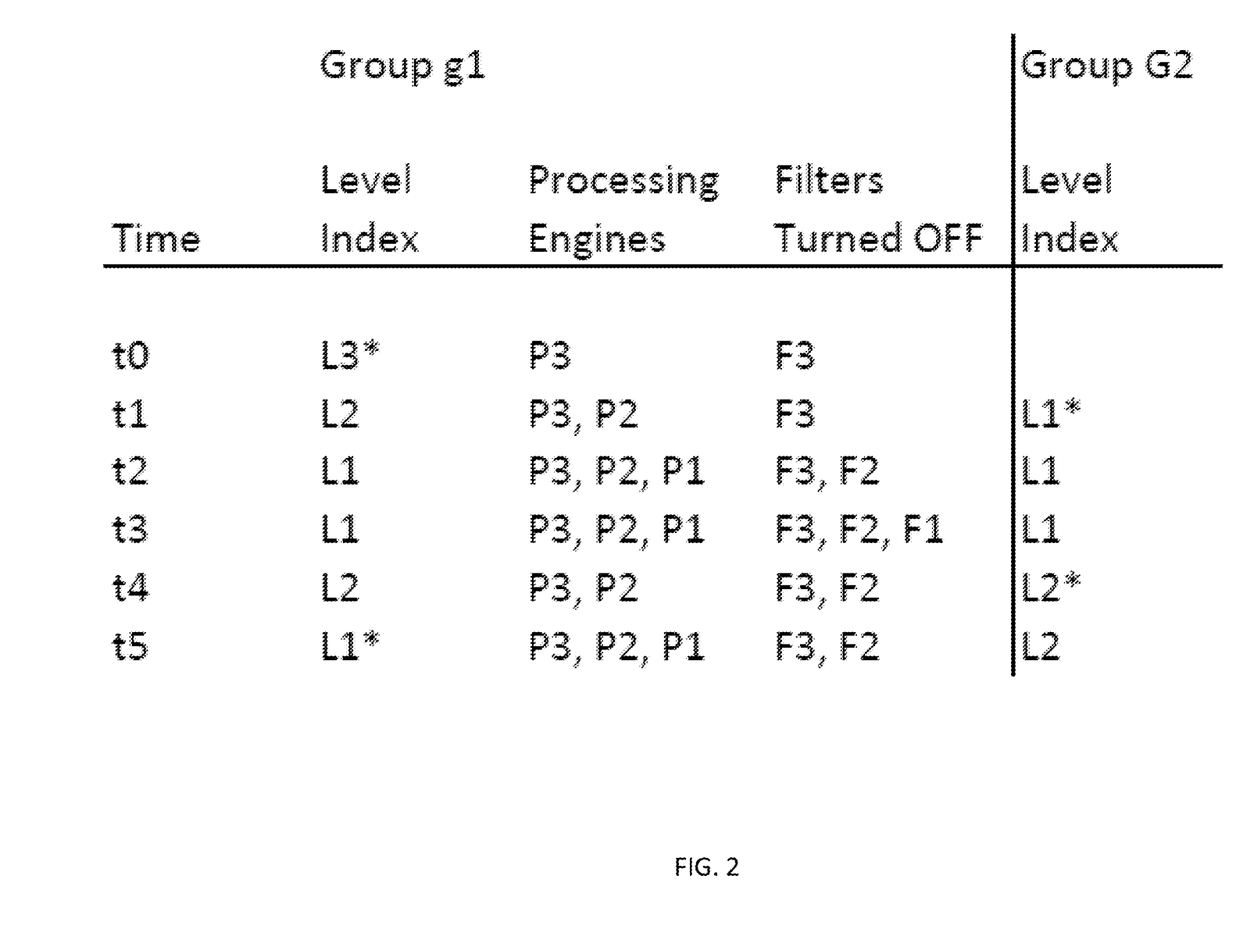
FIG. 2 depicts processing of the packets of a group, according to one embodiment.

With reference to FIG. 2, in one example, a new group g1 is generated at time t0. An operational level L3 and a token of time are designated to the group g1 at time t0. A grace period may be designated as well. An instance of a processing engine is created for the group g1, and the processing of type P3 is engaged. The filter F3 in this instance is turned off, i.e., signals generated by the processing of type P3 are allowed to pass to the analyzer. At time t0, the other filters can be ignored or turned on because any other type of processing is not performed. At time t1, the operational level for g1 is adjusted to L2 and, accordingly, processing of type P2 is added. The filter F2 is not turned off, however, to minimize any false positive signals. If a grace period indicating the time for which the filter F2 is to be maintained ON were not set previously, the grace period is also set at time t1.

At time t2, the operational level for g1 is further adjusted to L1 and, accordingly, processing of type P1 is added. The filter F2 is now turned off because the grace period expired, but the filter F1 is not turned off, because the processing of type P1 was newly added. In this example, the grace period starting at time t1 expired at time t2. In general, however, the grace period may expire before or after the time at which the processing level is adjusted again. In some embodiments, based on the state of the processing engine instance, the filter F2 may still remain turned on. At time t3, the operational level is not adjusted further, but according to the updated state of the instance of the processing engine for group g1 and upon the expiration of the grace period corresponding to processing P1, the filter F1 is turned off. As described above, this may be done because by time t3, a sufficient number of packets of the group g1 may have been processed using the processing of type P1 and, hence, such processing may no longer generate a significant number of false positive signals, if any. The grace periods associated with different levels can be the same or can be different.

At time t4, the operational level for g1 is adjusted to L2 and, as such, less processing of the subsequent packets of the group g1 is performed compared to the processing performed at times t2 and t3. The filter F1 may be ignored or may be turned on. At time t5, the token of time allocated to the group g1 expires, and a new operational level L1 is designated to the group g1. Though additional processing of type P1 may be performed for the subsequent packets of the group g1, the filter F1 may not be turned off at time t4 according to the state of the processing engine instance and/or a grace period. In some embodiments, the previous state information may be ignored after the expiration of the grace period, i.e., corresponding to the newly designated operational level L1, the filters F3, F2, and F1 may be turned off.

In general, the new operational level designated after the expiration of the token of time can be the same as the operational level initially designated to the group, a level corresponding to more processing than that corresponding to the initial level, or a level corresponding to less processing. For example, another group g2 is detected at time t1, and the level L1 is initially designated to the group g2. At time t4, the token of time associated with the group g2 expires and a new operational level L2, which corresponds to less processing than the level L1, is assigned to the group g2. In general, the times t0, t1, t2, etc., may not be evenly spaced. The spacing can be in seconds, minutes, hours, etc., and the spacing for different groups can be different.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for dynamically and adaptively controlling packet processing, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, configure the processing unit:
   as a controller to:
      designate a first operational level to a packet group, based on a first measure of a load of a processing engine, the first operational level being selected from a plurality of operational levels, the plurality of operational levels comprising a full operational level and a set of distinct partial operational levels;

configure the processing engine to process the packet group according to the first operational level;

determine that the first operational level is not the full operational level and that a second measure of the load represents less load than the first measure;

designate a second operational level to the packet group, based on the second measure of the load, the second operational level also being selected from the plurality of operational levels, at least a partial processing corresponding to the second operational level being greater than a partial processing corresponding to the first operational level;

reconfigure the processing engine according to the second operational level, wherein the processing engine performs a first set of tasks and a second set of tasks on a packet in the packet group; and determine a state of the processing engine based on the first and second operational levels; and as an error filter to:

continuously pass to an analyzer error signals generated by the processing engine while performing the first set of tasks; and selectively filter out and pass to the analyzer error signals generated by the processing engine while performing the second set of tasks, according to the state of the processing engine.

2. The system of claim 1, wherein the load comprises at least one of a processor load, a packet queue size.

3. The system of claim 1, wherein the controller is further configured to:

determine a token of time based on at least in part, at least one of: a randomized function, a characteristic of the packet group, the first operational level, and the load; and associate the token of time with the designation of the first operational level to the packet group.

4. The system of claim 1, wherein the controller is configured to:

determine that a third measure of the load represents a different load from the first measure and more load than the second measure; and designate a third operational level to the packet group, based on the third measure of the load, the third operational level also being selected from the plurality of operational levels, at least a partial processing corresponding to the third operational level being different from the partial processing corresponding to the first operational level and less than the at least partial processing corresponding to the second operational level.

5. The system of claim 1, further comprising a reconfigurable processing engine configured to perform at least one operation on a packet in the packet group, reconfiguration of the processing engine comprising selecting a set of operations to be performed based on, at least in part, an operational level designated to the packet group.

6. The system of claim 5, wherein the reconfigurable processing engine comprises:

a first processing module that is associated with a high operational level in the set of distinct partial operational levels, and is not associated with a different, low operational level in the set; and a second processing module that is associated with both the high level and the low level.

7. The system of claim 5, wherein the reconfigurable processing engine is programmed to provide network security.

8. The system of claim 1, wherein the controller is further configured to update the state of the processing engine based on a duration of processing.

9. The system of claim 8, wherein to selectively filter out and pass to the analyzer the error signals generated by the processing engine while performing the second set of tasks, according to the state of the processing engine, the controller is further configured to:

allocate a grace period;

turn on the error filter after designating the second operational level to the packet group; and turn off the error filter after expiration of the grace period.

10. The system of claim 1, wherein the controller is further configured to:

monitor a token of time associated with the packet group;

upon expiration of the token of time, designate a fourth operational level to the packet group, based on a fourth measure of the load, the fourth operational level being selected from the plurality of operational levels; and reconfigure a processing engine to process the group according to the fourth operational level.

11. A method for configuring processing of packets, the method comprising:

designating a first operational level to a packet group, based on a first measure of a load of a processing engine, the first operational level being selected from a plurality of operational levels, the plurality of operational levels comprising a full operational level and a set of distinct partial operational levels;

configuring the processing engine to process the packet group according to the first operational level;

obtaining a second measure of the load;

determining that the first operational level is not the full operational level and that the second measure of the load represents less load than the first measure;

designating a second operational level to the packet group based on the second measure of the load, the second operational level also being selected from the plurality of operational levels, at least a partial processing corresponding to the second operational level being greater than a partial processing corresponding to the first operational level;

reconfiguring the processing engine according to the second operational level, wherein the processing engine performs a first set of tasks and a second set of tasks on a packet in the packet group; and determining a state of the processing engine based on the first and second operational levels; and using an error filter:

continuously passing to an analyzer error signals generated by the processing engine while performing the first set of tasks; and selectively filtering out and passing to the analyzer error signals generated by the processing engine while performing the second set of tasks, according to the state of the processing engine.

12. The method of claim 11, wherein the load comprises at least one of a processor load, a packet queue size.

13. The method of claim 11, further comprising:
determining a token of time based on at least in part, at least one of: a randomized function, a characteristic of the packet group, the first operational level, and the load; and
associating the token of time with the designation of the first operational level to the packet group.

14. The method of claim 11, further comprising:
obtaining a third measure of the load;
determining that the third measure of the load represents a different load from the first measure and more load than the second measure; and
designating a third operational level to the packet group, based on the third measure of the load, the third operational level also being selected from the plurality of operational levels, at least a partial processing corresponding to the third operational level being different from the partial processing corresponding to the first operational level and less than the at least partial processing corresponding to the second operational level.

15. The method of claim 11, further comprising update the state of the processing engine based on a duration of processing.

16. The method of claim 11, wherein selectively filtering out and passing to the analyzer the error signals generated by the processing engine while performing the second set of tasks, according to the state of the processing engine comprises: selecting a grace period; and turning off the filtering after expiration of the grace period.

17. The method of claim 16, wherein the grace period a selected using a random function.

18. The method of claim 11, wherein the processing engine is configured to provide network security by detecting malicious packets.

* * * * *